US008832837B2

(12) United States Patent
Muttik

(10) Patent No.: US 8,832,837 B2
(45) Date of Patent: Sep. 9, 2014

(54) PREVENTING ATTACKS ON DEVICES WITH MULTIPLE CPUS

(75) Inventor: Igor Muttik, Herts (GB)

(73) Assignee: McAfee Inc., Santa Clara, CA (US)

( * ) Notice: Subject to any disclaimer, the term of this patent is extended or adjusted under 35 U.S.C. 154(b) by 119 days.

(21) Appl. No.: 13/538,157

(22) Filed: Jun. 29, 2012

(65) Prior Publication Data

US 2014/0007234 A1    Jan. 2, 2014

(51) Int. Cl.
*G06F 21/56* (2013.01)

(52) U.S. Cl.
USPC ............... 726/24; 726/22; 726/23; 726/25; 713/187; 713/188; 713/189; 713/194

(58) Field of Classification Search
None
See application file for complete search history.

(56) References Cited

U.S. PATENT DOCUMENTS

| | | | |
|---|---|---|---|
| 7,194,623 B1 * | 3/2007 | Proudler et al. | 713/164 |
| 7,457,951 B1 * | 11/2008 | Proudler et al. | 713/164 |
| 7,634,262 B1 | 12/2009 | Li | |
| 7,673,343 B1 * | 3/2010 | Barton et al. | 726/24 |
| 7,975,298 B1 | 7/2011 | Venkatasubrahmanyam | |
| 2006/0031940 A1 * | 2/2006 | Rozman et al. | 726/27 |
| 2007/0226795 A1 * | 9/2007 | Conti et al. | 726/22 |
| 2008/0184373 A1 * | 7/2008 | Traut et al. | 726/26 |
| 2008/0216176 A1 * | 9/2008 | Lomont et al. | 726/24 |
| 2009/0193230 A1 * | 7/2009 | Findeisen et al. | 712/34 |
| 2009/0217377 A1 * | 8/2009 | Arbaugh et al. | 726/23 |
| 2011/0016529 A1 * | 1/2011 | Kakie | 726/24 |
| 2013/0036464 A1 * | 2/2013 | Glew et al. | 726/22 |

FOREIGN PATENT DOCUMENTS

| | | |
|---|---|---|
| WO | 98-45778 A2 | 10/1998 |
| WO | 2011-046356 A2 | 4/2011 |

OTHER PUBLICATIONS

International Search Report and Written Opinion regarding PCT application No. PCT/US2013/048168, dated Oct. 22, 2013.

* cited by examiner

*Primary Examiner* — Jung Kim
*Assistant Examiner* — Adrian Stoica
(74) *Attorney, Agent, or Firm* — Wong, Cabello, Lutsch, Rutherford & Brucculeri, LLP

(57) ABSTRACT

Disclosed are systems and methods to utilize two different processing units (e.g., CPUs) to monitor each other. The processing units may have limited visibility and/or read only access to each other to reduce the possibility that one affected processing unit could compromise the second processing unit. Devices containing multiple processing units of different architectures could be configured so that one type of processing unit monitors another type of processing unit. When the processing units are different architectures a single piece of malicious software (malware) is unlikely to affect both processing units. Each processing unit can be configured to detect rootkits and other types of malware on the other processor(s) of the system/device.

19 Claims, 5 Drawing Sheets

PREVENTING ATTACKS ON DEVICES WITH MULTIPLE CPUS

TECHNICAL FIELD

This disclosure relates generally to a system and method for utilizing two distinct processing units to monitor each other and detect abnormalities which could indicate the other processing unit has been compromised. More particularly, but not by way of limitation, this disclosure relates to systems and methods to utilize processing units of different architectures and operating environments to monitor each other and detect viruses and other malicious software even if the infecting software includes stealth like mechanisms.

BACKGROUND

Contemporary mobile devices typically use two processing units. A first of the processing units can be used for communication (e.g., transmission/receiving, encoding/decoding, protocol support, etc.) while a second of the processing units can be used for user interface or application support (e.g., screen, keyboard, interfaces, Operating System, applications). Because there are two processing units a hacker could attempt to compromise either one.

Rootkits are a stealthy type of malicious software (malware) designed to hide the existence of certain processes or programs from normal methods of detection. Rootkits typically enable continued privileged access to the compromised system. Rootkit installation may be either automated or activated when an attacker obtains root or Administrator access. Obtaining this access is either a result of direct attack on a system (i.e., exploiting a known vulnerability) or by getting access to a password (either by cracking, privilege escalation, or social engineering). Once installed it is typically a goal of a rootkit to hide the intrusion as well as to maintain privileged access for itself (or other processes). Like any software, rootkits can have a good purpose or a malicious purpose. Full control over a system means that existing software can be modified, including software that might otherwise be used to detect or circumvent an attack.

Rootkit detection is difficult because a rootkit may be able to subvert the software that is intended to find it. Detection methods include using an alternative, trusted operating system; behavioral-based methods; signature scanning; difference scanning; and memory dump analysis. Removal can be complicated or practically impossible, especially in cases where the rootkit resides in the kernel; reinstallation of the operating system may be the only available solution to the problem. When dealing with firmware rootkits, removal may require hardware replacement, or specialized equipment.

Modern rootkits do not necessarily elevate access, but rather are used to make another software payload undetectable by adding stealth capabilities. Most rootkits are classified as malware, because the payloads they are bundled with are malicious. For example, a payload might covertly steal user passwords, credit card information, computing resources, or conduct other unauthorized activities. A small number of rootkits may be considered utility applications by their users: for example, a rootkit might cloak a CD-ROM-emulation driver, allowing video game users to defeat anti-piracy measures that require insertion of the original installation media into a physical optical drive to verify that the software was legitimately purchased.

Rootkits can run at different privilege levels (e.g., modes) of a computer environment. User-mode rootkits run at the same mode as most other user applications, rather than low-level system processes. They have a number of possible installation vectors to intercept and modify the standard behavior of application programming interfaces (APIs). Some inject a dynamically-linked library (such as a .DLL file, .dylib file, a .so file, or a .shlib file) into other processes, and are thereby able to execute inside any target process to spoof it; others with sufficient privileges simply overwrite the memory of a target application.

Kernel-mode rootkits run with the highest operating system privileges by adding code or replacing portions of the core operating system, including both the kernel and associated device drivers. Most operating systems support kernel-mode device drivers, which execute with the same privileges as the operating system itself. As such, many kernel-mode rootkits are developed as device drivers or loadable modules, such as loadable kernel modules or device drivers. This class of rootkit has unrestricted security access. Kernel rootkits can be especially difficult to detect and remove because they operate at the same security level as the operating system itself, and are thus able to intercept or subvert the most trusted operating system operations and thereby "hide" themselves in a stealth-like manner.

Because rootkits and other viruses (which include all types of malicious code: Trojan horses, exploits, shellcodes, keyloggers, backdoors, spyware, botnets, adware, information stealers, etc.) operate in the above described stealth-like manners (among others) they are difficult to detect and/or clean from within the scope of the infected operating environment. This disclosure addresses these and other issues to provide methods and systems to detect active rootkits and other viruses (i.e., malicious code) that attempt to conceal themselves from detection on the infected processing unit.

DETAILED DESCRIPTION

As explained above, rootkit detection from within an infected computing environment can be difficult to detect. This is mainly because once active a rootkit typically actively conceals itself from detection by intercepting attempts to detect it and returning manufactured results to the process attempting to perform the detection. Actions such as requesting a list of running processes, or a list of files in a directory, cannot be trusted to behave as expected. Prior art methods for operating-system-level rootkit detection typically require a user to shut down the computer suspected of infection, and then to check its storage by booting from an alternative trusted medium (e.g. a rescue CD-ROM or USB flash drive). The technique is effective because a rootkit cannot actively hide its presence if it is not running. However, this type of remedial action is not typically available for mobile devices (e.g., cell phones) and they typically require expensive repair up to and including returning to the factory for service. As explained further below, disclosed are techniques to address these and other problems by using systems and methods for monitoring a first processing unit from a second processing unit, where the access between the two processing units can be defined and the monitoring information can be updated in a secure manner.

Figure 1:
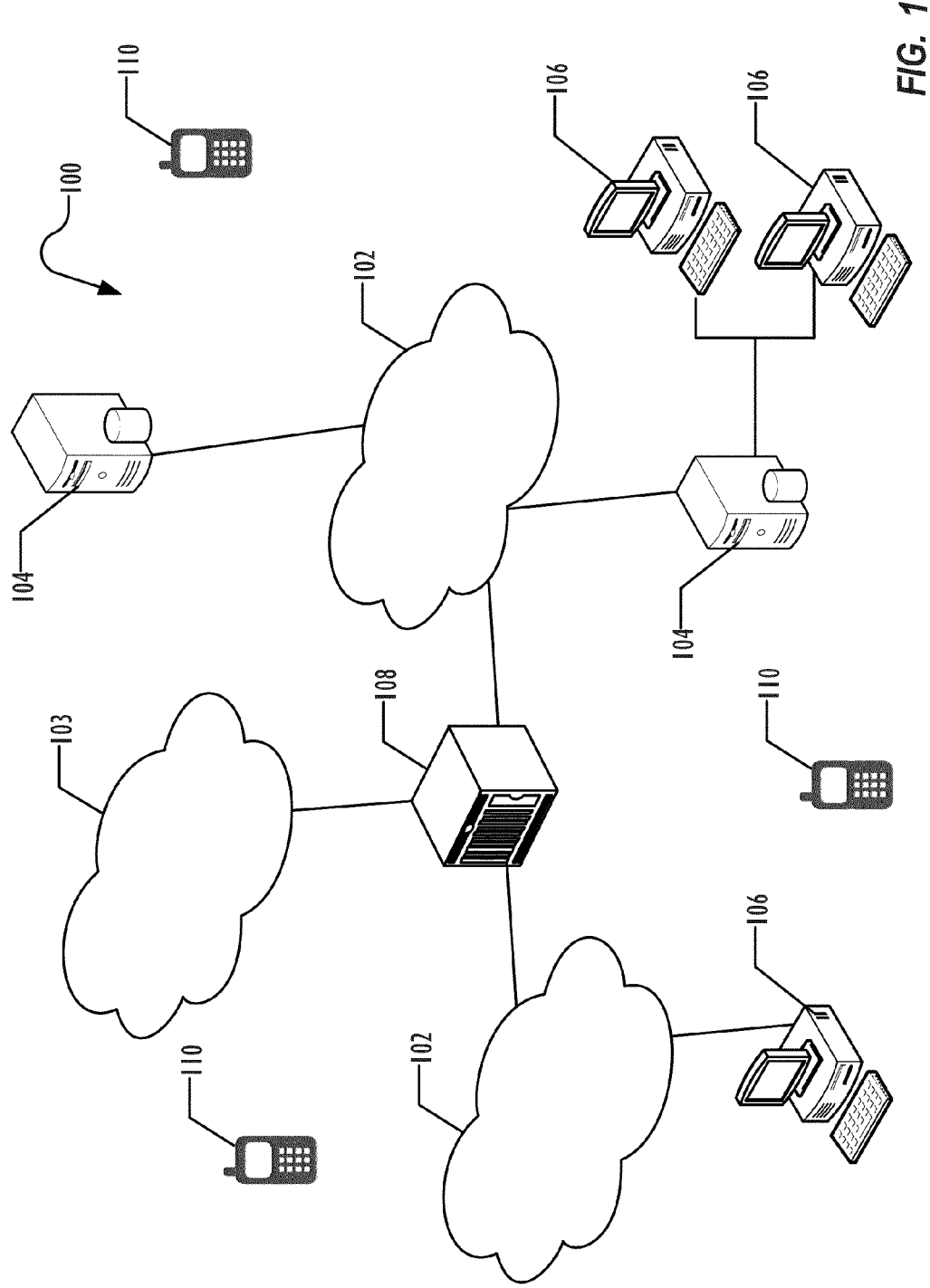
FIG. 1 is a block diagram illustrating network architecture 100 according to one or more disclosed embodiments.

Referring now to FIG. 1, infrastructure 100 is shown schematically. Infrastructure 100 contains computer networks 102. Computer networks 102 include many different types of computer networks available today such as the Internet, a corporate network or a Local Area Network (LAN). Each of these networks can contain wired or wireless devices and operate using any number of network protocols (e.g., TCP/IP). Networks 102 are connected to gateways and routers (represented by 108), end user computers 106 and computer servers 104. Also shown in infrastructure 100 is cellular network 103 for use with cellular communication. As is known in the art, cellular networks support cell phones and many other types of devices (e.g., tablet computers not shown). Cellular devices in the infrastructure 100 are illustrated as cell phones 110.

Figure 2:
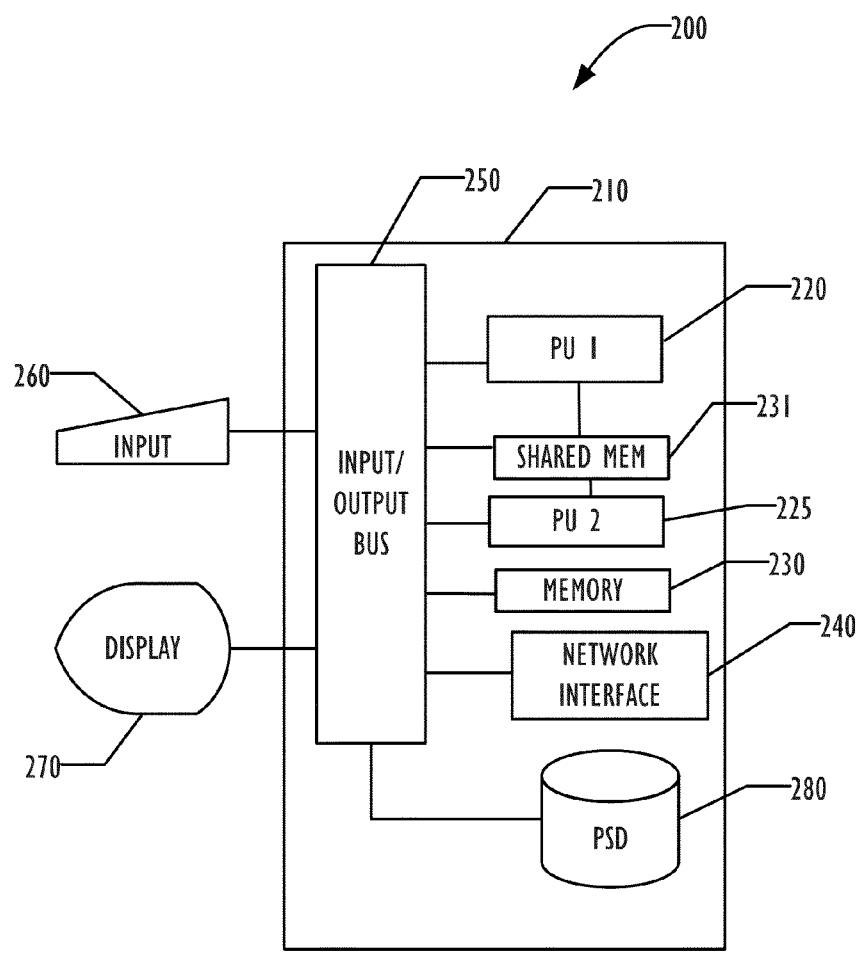
FIG. 2 is a block diagram illustrating a computer with multiple processing units which could be configured to monitor each other according to one or more disclosed embodiments.

Referring now to FIG. 2, an example processing device 200 for use in providing disclosed detection techniques according to one embodiment is illustrated in block diagram form. Processing device 200 may serve as processor in a cellular phone 110, gateway or router 108, client computer 106, or a server computer 104. Example processing device 200 comprises a system unit 210 which may be optionally connected to an input device for system 260 (e.g., keyboard, mouse, touch screen, etc.) and display 270. A program storage device (PSD) 280 (sometimes referred to as a hard disc, flash memory, or computer readable medium) is included with the system unit 210. Also included with system unit 210 is a network interface 240 for communication via a network (either cellular or computer) with other computing and corporate infrastructure devices (not shown) or other cellular communication devices. Network interface 240 may be included within system unit 210 or be external to system unit 210. In either case, system unit 210 will be communicatively coupled to network interface 240. Program storage device 280 represents any form of non-volatile storage including, but not limited to, all forms of optical and magnetic memory, including solid-state, storage elements, including removable media, and may be included within system unit 210 or be external to system unit 210. Program storage device 280 may be used for storage of software to control system unit 210, data for use by the processing device 200, or both.

System unit 210 may be programmed to perform methods in accordance with this disclosure. System unit 210 comprises one or more processing units (represented by PU 1 220 and PU 2 225), input-output (I/O) bus 250, memory 230, and shared memory 231. Memory access to memory 230 can be accomplished using the communication bus 250. Shared memory 231 represents a shared memory or memory area that can be directly accessed by either processing unit. Processing units 220 and 225 may include any programmable controller device including, for example, a mainframe processor, a cellular phone processor, or one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company). Memory 230 may include one or more memory modules and comprise random access memory (RAM), read only memory (ROM), programmable read only memory (PROM), programmable read-write memory, and solid-state memory. PUs 220 and 225 may also include some internal memory including, for example, cache memory or memory dedicated to a particular processing unit and isolated from other processing units for use in maintaining monitoring information for use with disclosed embodiments of rootkit detection.

Processing device 200 may have resident thereon any desired operating system. Embodiments of disclosed detection techniques may be implemented using any desired programming language, and may be implemented as one or more executable programs, which may link to external libraries of executable routines that may be supplied by the provider of the detection software/firmware, the provider of the operating system, or any other desired provider of suitable library routines. As used herein, the term "a computer system" can refer to a single computer or a plurality of computers working together to perform the function described as being performed on or by a computer system.

In preparation for performing disclosed embodiments on processing device 200, program instructions to configure processing device 200 to perform disclosed embodiments may be provided stored on any type of non-transitory computer-readable media, or may be downloaded from a server 104 onto program storage device 280. It is important to note that even though PUs (220 and 225) are shown on a single processing device 200 it is envisioned and may be desirable to have more than one processing device 200 in a device configured for rootkit detection according to disclosed embodiments. That is, PU 220 and 225 could monitor each other from within a single processing device 200 or processing units from different processing devices (e.g., multiple processing devices 200) could monitor each other.

Figure 3:
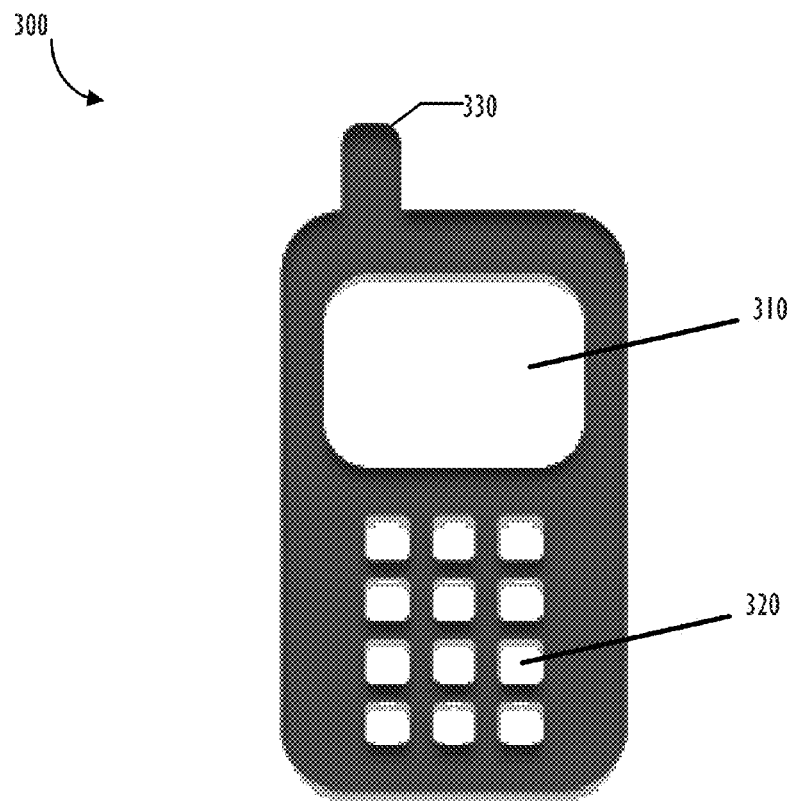
FIG. 3 is an illustration of a cellular phone which could be configured with two processing units according to one or more disclosed embodiments.

Referring now to FIG. 3, cellular phone 300 (an example of cellular devices 110 from FIG. 1) is shown. Cellular phone 300 can be configured with one or more processing devices 200 and thus have a plurality of processing units (e.g., 220, 225). Cellular phone 300 also has a user interface screen 310, a user input mechanism 320 and an antenna 330. Cellular phone 300 can also have multiple antennas for cellular, WiFi, radio frequency identification (RFID), near filed communication (NFC), etc. In modern cellular phones, user interface 310 and a communication interface (not shown) that communicates with a cellular network via antenna 330 can be controlled by different processing units or processing devices. Among other things, this enables a user of the cellular phone to interact with applications executing on the cellular phone while still engaged in a communication session via the cellular network. Additionally, different processing units can be configured into cellular phone 300 based on power consumption requirements and be configured to allow for extended battery life of cellular phone 300 when it is monitoring the cellular network but not actively being interacted with by a user. A cellular phone 300 with multiple (somewhat isolated) processing units provides a suitable environment to utilize the detection techniques disclosed herein.

Because modern cellular telephones (i.e., smartphones) typically have both a cellular network interface and a computer network interface they can be infected in many different ways. A phone (e.g., 300) could be infected via the cellular network by a process of impersonating a mobile mast to infect and exploit the communication processing unit. Once infected this type of attack may allow for a propagation of "worms" across phones leading to severe impact. Also, when a cellular phone connects to a computer network malicious code could be transferred to the phone in the context of a data download or an application download.

With the above explained details regarding rootkits, their detection issues, infrastructure details, and device configurations, we now turn to a discussion of various embodiments to provide improved rootkit detection techniques. As will be seen below, different processing units from within a single device (e.g., mobile phone 300) can monitor each other and their monitoring will be unaffected by a rootkit infecting the processor being monitored. As will be understood by one of ordinary skill in the art, given this disclosure, the stealth-like detection avoidance mechanisms of the rootkit cannot affect or distort the monitoring being performed by an independent processing unit.

Figure 4:
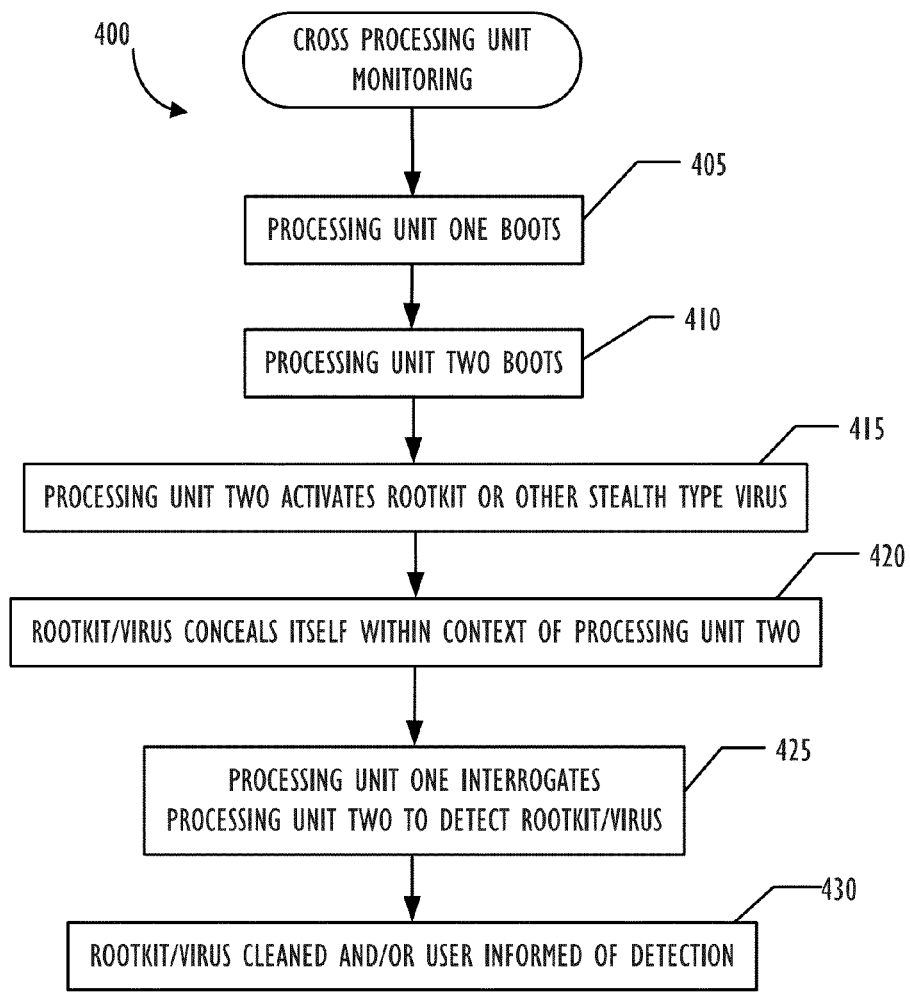
FIG. 4 is a flowchart of a process for cross processing unit monitoring to illustrate one example process flow according to one or more disclosed embodiments.

Referring now to FIG. 4, flow chart 400 illustrates a cross processing unit monitoring process according to one disclosed embodiment. In the following example the numbering of the CPUs is just an example for two processing units. Of course, any number of processing units with different numbering is also possible. Beginning at block 405 a first processing unit (PU 10 on a device such as cellular phone 300 is initialized (e.g., "boots"). Next, at block 410, a second processing unit (PU 2) on the device is initialized. Of course, each of the processing units can be initialized in parallel or sequentially depending on software or hardware design. At block 415, PU 2 becomes affected (e.g., infected) with a rootkit, a stealth type virus (any type of malicious software). As these types of viruses and malware typically do the rootkit (or virus) conceals itself within the context of PU 2 and PU 2's operating system (block 420). At some later time (block 425), PU 1 interrogates PU 2 and because PU 1 is not affected by the stealth like concealment capabilities the rootkit or virus is detected. After detection (block 430) the user can be informed of the detection and an attempt to clean the environment of PU 2 can be attempted.

Figure 5:
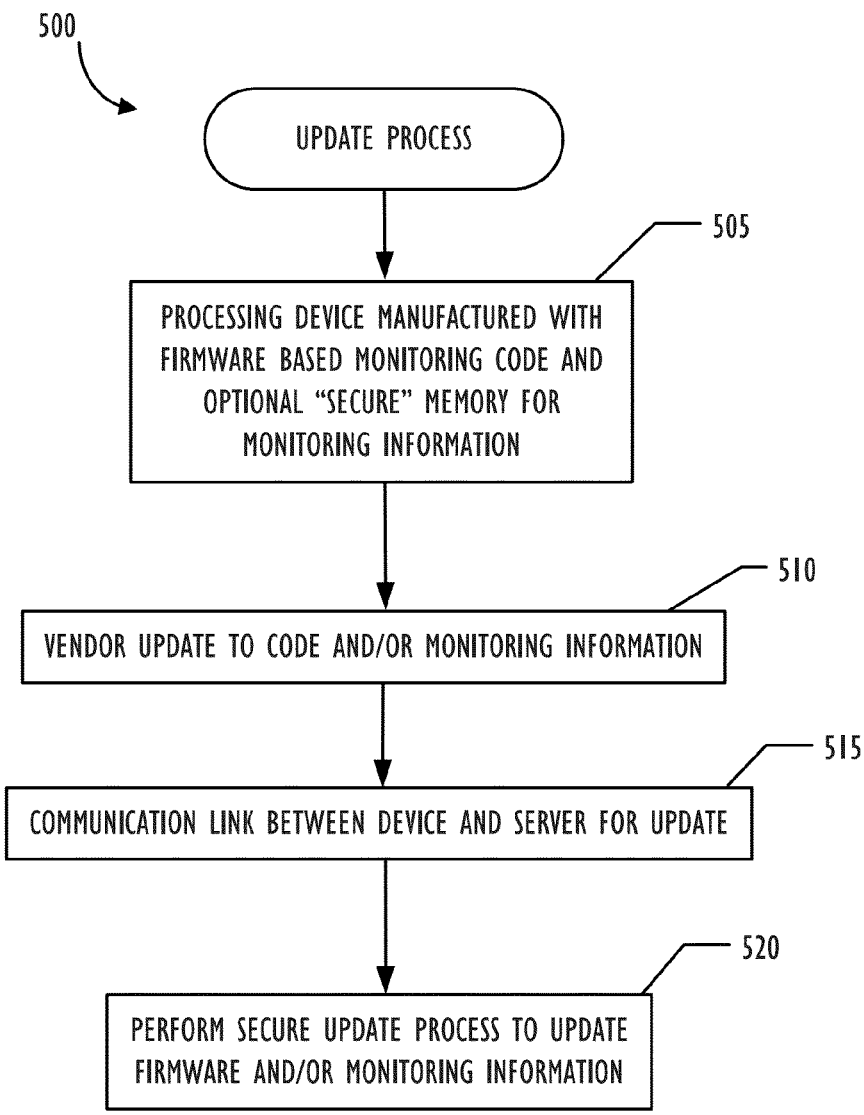
FIG. 5 is a flowchart of a process to update monitoring code and/or monitoring information associated with detection techniques according to one or more disclosed embodiments.

Referring now to FIG. 5, flow chart 500 illustrates an update process for the monitoring code or monitoring information required by one processing unit to monitor another. It is envisioned that at processing device manufacture time, a processing device could be built such that firmware based monitoring code (e.g., code to monitor a different type of processor) could be integrated with the processing device (block 505). This could typically be done by putting the code in firmware of the device or other methods known to those of skill in the art of processor manufacture. Additionally, a "secure" memory area could be defined and dedicated to maintaining monitoring information about the operating environment of the other processing unit to be monitored by this processing unit. This information could include information about global interrupt table contents, specific memory address values, etc. The monitoring information would be specifically defined for the operating environment to be monitored (e.g., particular operating system and relevant device software version information). Because, operating systems and software are updated periodically via upgrades or patches, it may be desirable for an operating system (or device software) vendor to update the monitoring code and/or the monitoring information as shown in block 510. The updated code and/or information can be made available on an update server and a communication link established between the update server and the device containing both the monitoring PU and the monitored PU (block 515). After establishment of the communication link a secure update process can be performed as necessary (block 520). As will be apparent, any update process to update the operating environment being monitored may have to be coordinated with the update process outlined in process 500.

In different embodiments, the processing unit being monitored and the processing unit performing the monitoring may be of different architectures and run completely different environments. The minimum requirement is a suitable level of visibility into the monitored environment from the monitoring environment. In a configuration where both environments have similar operating conditions it may be important to isolate them sufficiently so as to not allow infection of both the monitored and monitoring environment at the same time. Obviously, if both environments are infected simultaneously a sophisticated rootkit or virus could attempt to actively conceal attempts at the cross monitor. It is also conceivable to have more than two PUs where one watches multiple others (and they can each watch each other) in a fashion similar to the presented embodiment of two PUs.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

The following examples pertain to further embodiments of this disclosure. Specifics in the examples may be used anywhere in one or more embodiments.

What is claimed is:

1. A non-transitory computer readable medium comprising computer executable instructions stored thereon to cause two or more processing units to:

interrogate, by a first processing unit, information associated with a second processing unit;

analyze, by the first processing unit, the information associated with the second processing unit to determine if an operating condition associated with the second processing unit indicates a first potential abnormality, the first potential abnormality comprising malicious code operable to attempt concealment from instructions executed by the second processing unit;

interrogate, by the second processing unit, information associated with the first processing unit; and analyze, by the second processing unit, the information associated with the first processing unit to determine if an operating condition associated with the first processing unit indicates a second potential abnormality comprising malicious code operable to attempt concealment from instructions executed by the first processing unit.

2. The non-transitory computer readable medium of claim 1 further comprising instructions to cause at least one of the two or more processing units to perform a remedial action based on the determination.

3. The non-transitory computer readable medium of claim 1 wherein the instructions to cause the first processor to analyze the information associated with the second processing unit comprise instructions to cause the first processing unit to compare the information associated with the second processing unit with monitoring information.

4. The non-transitory computer readable medium of claim 3 wherein the monitoring information is accessible by the first processing unit and not accessible by the second processing unit.

5. The non-transitory computer readable medium of claim 1 wherein the first and second processing units have different architectures.

6. A mobile device comprising:
a first processing unit; and
a second processing unit, configured to monitor an operating environment associated with the first processing unit;
wherein, the second processing unit is configured to:
  interrogate information associated with the first processing unit; and
  analyze the information associated with the first processing unit to determine if an operating condition of the operating environment associated with the first processing unit indicates a first potential abnormality, the first potential abnormality comprising malicious code operable to attempt concealment from the operating environment associated with the first processing unit; and
wherein the first processing unit is configured to:
  interrogate information associated with the second processing unit;
  analyze the information associated with the second processing unit to determine if an operating condition of the operating environment associated with the second processing unit indicates a second potential abnormality, the second potential abnormality comprising malicious code operable to attempt concealment from the operating environment associated with the second processing unit.

7. The mobile device of claim 6, wherein the second processing unit is further configured to perform a remedial action based on the determination that an operating condition of the operating environment associated with the first processing unit indicates the first potential abnormality.

8. The mobile device of claim 6, further comprising a cellular communication interface, wherein the first processing unit is configured to support the cellular communication interface.

9. The mobile device of claim 6, wherein the first processing unit is configured to support a user interface function.

10. The mobile device of claim 6, wherein the first processing unit is configured to support a cellular communication interface and the second processing unit is configured to support a user interface function.

11. The mobile device of claim 6, wherein the first processing unit and the second processing unit have different architectures.

12. The mobile device of claim 6, wherein the second processing unit has access to monitoring information that is not accessible by the first processing unit.

13. The mobile device of claim 12, wherein the second processing unit is configured to analyze the information associated with the first processing unit by comparing the information associated with the first processing unit to at least a portion of the monitoring information.

14. The mobile device of claim 6, wherein the second processing unit has access to monitoring information that is accessible in read-only mode from the first processing unit.

15. A method of updating a mobile device, the mobile device comprising a first processing unit and a second processing unit, wherein the first processing unit is configured to monitor the second processing unit, the method comprising:
  establishing a connection between a mobile device and an update server;
  retrieving, from the update server, first code or monitoring information to be utilized by a first processing unit to monitor a second processing unit, wherein the first and second processing units are included in the mobile device;
  retrieving, from the update server, second code or monitoring information to be utilized by the second processing unit to monitor the first processing unit;
  performing an update process to store the first code or monitoring information to an area of memory accessible by the first processing unit and not accessible by the second processing unit;
  performing an update process to store the second code or monitoring information to an area of memory accessible by the second processing unit and not accessible by the first processing unit,
  wherein the first code or monitoring information to be utilized by the first processing unit to monitor the second processing unit comprises code or monitoring information to determine if an operating condition of the environment associated with the second processing unit indicates a first potential abnormality, the first potential abnormality comprising malicious code operable to attempt concealment from the operating system associated with the second processing unit; and
  wherein the second code or monitoring information to be utilized by the second processing unit to monitor the first processing unit comprises code or monitoring information to determine if an operating condition of the environment associated with the first processing unit indicates a second potential abnormality, the second potential abnormality comprising malicious code operable to attempt concealment from the operating system associated with the first processing unit.

16. The method of claim 15, wherein the first processing unit and the second processing unit have different architectures.

17. The method of claim 15, wherein the area of memory accessible to the first processing unit comprises an area of memory utilized to store firmware code.

18. The method of claim 17, wherein the area of memory accessible to the first processing unit further comprises an area of memory to store the monitoring information separate from the area of memory utilized to store firmware code.

19. The method of claim 15, wherein only monitoring information is retrieved and updated on the mobile device.

\* \* \* \* \*